No. 894,056. PATENTED JULY 21, 1908.
H. A. ROGERS.
AQUARIUM ATTACHMENT.
APPLICATION FILED MAR. 27, 1907.
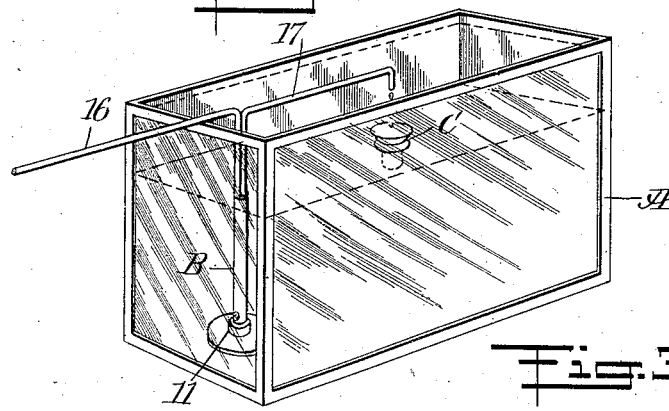
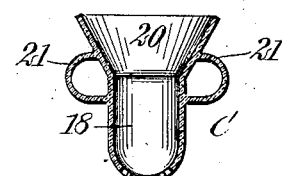
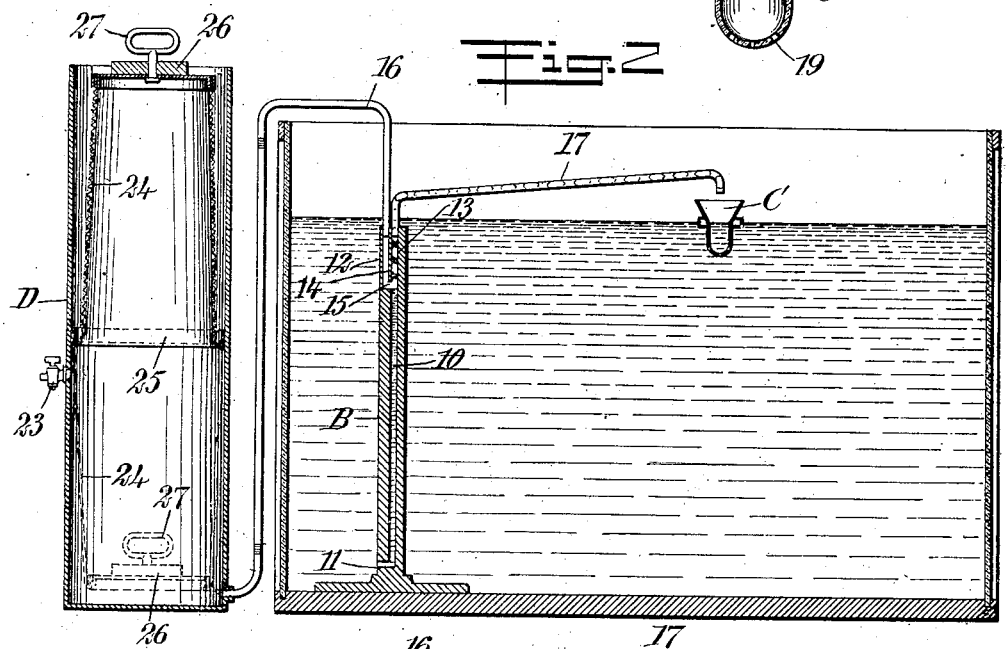
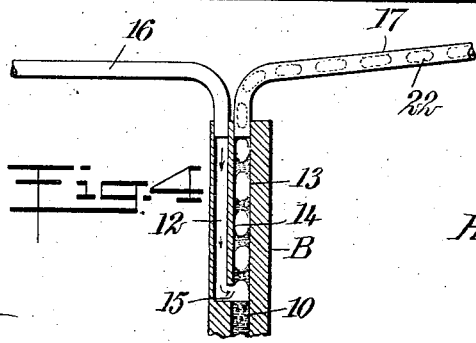
WITNESSES
INVENTOR
Henry A. Rogers
BY
ATTORNEYS

UNITED STATES PATENT OFFICE.

HENRY AUSTIN ROGERS, OF PAGOSA JUNCTION, COLORADO.

AQUARIUM ATTACHMENT.

No. 894,056.  Specification of Letters Patent.  Patented July 21, 1908.

Application filed March 27, 1907. Serial No. 364,784.

*To all whom it may concern:*

Be it known that I, HENRY AUSTIN ROGERS, a citizen of the United States, and a resident of Pagosa Junction, in the county of Archuleta and State of Colorado, have invented a new and useful Improvement in Aquarium Attachments, of which the following is a full, clear, and exact description.

The purpose of the invention is to provide an attachment that will act to re-vitalize the water whereby to add to the comfort and lifetime of the occupants of the aquarium, rendering it practicable to keep more fish in a healthy condition in a given quantity of water than if they were compelled to subsist only upon the oxygen thrown out by the plant life employed.

Another purpose of the invention is to provide a means for establishing a circulation of the water, the water being delivered at a point above its level alternately with an air supply.

A further purpose of the invention is to provide a simple and convenient means for supplying the necessary air and also a means for delivering the water from the main body in the aquarium to a filtering device whereby to render the water clear.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a perspective view of an aquarium fitted with my improved device; Fig. 2 is an enlarged vertical section through the aquarium and the applied attachment; Fig. 3 is a vertical section through the filter employed; and Fig. 4 is an enlarged sectional view of the water feeding column and its connected air supply and water drip pipe.

A represents an aquarium of any suitable form or of any desired size. Within the said aquarium A a stand-pipe B is located, being secured to the bottom of the aquarium in any desired manner. The chamber 10 of the said stand-pipe B is provided at its lower end with a branch pipe 11 that is in communication with the water at the bottom portion of the aquarium, and the top of the said stand-pipe B is below the level of the water contained in the aquarium. The stand-pipe B is provided at its upper end with two longitudinal chambers 12 and 13 that are parallel and are separated by a partition 14, but both of the said chambers 12 and 13 have a communication with the main chamber 10 of the said stand-pipe, as is best illustrated at 15 in Fig. 4. The chamber 12 is adapted to receive the delivery end of an air supply pipe 16, while the chamber 13 at its upper end receives the inlet end of a combined water and air discharge pipe 17. The pipe 17, and in fact all of the pipes with the exception of the air supply pipe 16, may be made of glass and are preferably so made. The discharge pipe 17 extends above the level of the water, usually with more or less of an upward inclination and at its upper end is bent downward so as to lie over a floatable strainer C; but the pipe 17 may be of any desired shape or angle between the chamber 13 and the point above the strainer.

The strainer C may be constructed of any desired material, and the said strainer, as is shown particularly in Fig. 3, consists of a body section 18 circular in cross section and rounded at the bottom, being provided at its bottom portion with suitable apertures 19, and the upper portion of the said body 18 of the strainer is made to flare outward so as to be more or less funnel-shaped, for the purpose of presenting a large area to the dsicharge pipe and so that, as the strainer floats, the drops of water striking the flare will change the direction of the strainer and prevent it from floating from under the discharge pipe.

The strainer is provided with an annular air chamber 21, formed exteriorly on the body for the purpose of floating it.

Air may be supplied to the pipe 16 from any suitable form of apparatus. When the air is so supplied from the pipe 16, and the flow controlled in any suitable manner, it escapes in bubbles from the chamber 12 into the chamber 13, and as each bubble rises in the chamber 13 it is followed by a volume of water from the chamber 10, causing alternate bubbles of air and drops of water to pass from the chamber 13 to the pipe 17, so that the water and air are delivered to the strainer C.

In Fig. 2 I have illustrated a means for supplying air to the said pipe 16. This means consists of a cylinder D that is provided between its top and its bottom preferably with a faucet 23 whereby to admit air to the interior of the said cylinder. Above the faucet 23 the lower end portion of a jacket 24 is secured, as is illustrated at 25 in Fig. 2. This jacket is made of an air-proof material, and at its upper end, which normally extends to the upper portion of the cylinder D, is provided with a weight 26, and an attached handle 27. The said jacket 24 is elevated by the handle 27 and air is admitted into the cylinder through the faucet 23. When sufficient air is contained in the cylinder to sustain the jacket 24 the faucet 23 is closed, then the air is gradually and uniformly supplied to the stand-pipe B for the purpose that has been described until the weight 26 arrives at the bottom portion of the cylinder D when the said cylinder will necessarily have to be again refilled, but I desire it to be understood that while the cylinder D and its accompanying parts described constitute a simple and economic means for carrying out the results, any equivalent therefor may be substituted.

Having thus described my invention, I claim as new and desire to secure by Letters Patent,—

The combination with an aquarium tank, of a stand pipe secured to the bottom of the tank, and communicating with the tank through an opening near the bottom of the pipe, said pipe having a plurality of chambers at its top, the chambers communicating with each other and with said opening of the stand pipe, a substantially horizontal pipe leading from one of said chambers and discharging into the tank above the level of the water therein, a pipe leading from the other chamber outside of the aquarium, means connected with the last named pipe for supplying air to the stand pipe, and a strainer below the open end of the horizontal pipe.

In testimony whereof I have signed my name to this specification in the presence of two subscribing witnesses.

HENRY AUSTIN ROGERS.

Witnesses:
 DAVID HENCH,
 W. ZABRISKIE.